United States Patent
Yada et al.

(10) Patent No.: US 8,974,720 B2
(45) Date of Patent: Mar. 10, 2015

(54) METHOD FOR PRODUCING CERAMIC LAMINATE

(75) Inventors: Chihiro Yada, Susono (JP); Yoshitaka Minamida, Susono (JP); Keiichi Kohama, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 141 days.

(21) Appl. No.: 13/703,485

(22) PCT Filed: Jul. 1, 2010

(86) PCT No.: PCT/JP2010/061277
§ 371 (c)(1),
(2), (4) Date: Dec. 11, 2012

(87) PCT Pub. No.: WO2012/001808
PCT Pub. Date: Jan. 5, 2012

(65) Prior Publication Data
US 2013/0093130 A1  Apr. 18, 2013

(51) Int. Cl.
*C04B 35/447* (2006.01)
*C04B 35/628* (2006.01)
(Continued)

(52) U.S. Cl.
CPC .............. *H01M 4/0471* (2013.01); *B28B 1/16* (2013.01); *B32B 18/00* (2013.01); *B82Y 30/00* (2013.01); *C04B 35/447* (2013.01); *C04B 35/62805* (2013.01); *C04B 35/62892* (2013.01); *C04B 35/62897* (2013.01); *C04B 2235/3203* (2013.01); *C04B 2235/3217* (2013.01); *C04B 2235/3275* (2013.01); *C04B 2235/3287* (2013.01); *C04B 2235/5436* (2013.01); *C04B 2235/5454* (2013.01); *C04B 2237/34* (2013.01); *H01M 4/131* (2013.01); *H01M 4/1391* (2013.01); *H01M 4/485* (2013.01); *H01M 4/505* (2013.01); *H01M 4/525* (2013.01); *H01M 10/0525* (2013.01); *H01M 10/0562* (2013.01); *H01M 10/0585* (2013.01); *Y02E 60/122* (2013.01);
(Continued)

(58) Field of Classification Search
USPC .................................................. 264/618, 610
See application file for complete search history.

(56) References Cited

U.S. PATENT DOCUMENTS

2006/0115579 A1* 6/2006 Mukherjee et al. ............. 427/58
2007/0202414 A1* 8/2007 Yoshida et al. ............... 429/304
(Continued)

FOREIGN PATENT DOCUMENTS

JP  A-2004-022706  1/2004
JP  A-2007-005279  1/2007
(Continued)

*Primary Examiner* — Erin Snelting
(74) *Attorney, Agent, or Firm* — Oliff PLC

(57) ABSTRACT

The present invention provides a method for producing a ceramic laminate capable of preventing coming-off of materials and warpage of the ceramic laminate by a heat treatment at a relatively-low temperature, and a ceramic laminate produced by the production method. Disclosed is a method for producing a ceramic laminate having a layer structure in which two or more layers are laminated, including: a step of producing a laminate including a first layer and a second layer, the first layer containing a solid electrolyte and the second layer containing at least composite particles obtained by covering an electrode active material with the solid electrolyte; and a step of performing a heat treatment on the laminate including the first and second layers at a temperature of 500° C. or more and less than 700° C.

5 Claims, 9 Drawing Sheets

(51) Int. Cl.
  *B28B 1/16* (2006.01)
  *H01M 4/04* (2006.01)
  *B32B 18/00* (2006.01)
  *B82Y 30/00* (2011.01)
  *H01M 4/131* (2010.01)
  *H01M 4/1391* (2010.01)
  *H01M 10/0525* (2010.01)
  *H01M 10/0562* (2010.01)
  *H01M 10/0585* (2010.01)
  *C04B 35/01* (2006.01)
  *C01B 25/45* (2006.01)
  *H01M 4/485* (2010.01)
  *H01M 4/505* (2010.01)
  *H01M 4/525* (2010.01)

(52) U.S. Cl.
  CPC ........... *C04B 35/01* (2013.01); *C04B 2235/447* (2013.01); *C04B 2235/76* (2013.01); *C04B 2235/80* (2013.01); *C04B 2237/66* (2013.01); *C01B 25/45* (2013.01)
  USPC ........................................................ 264/618

(56) References Cited

U.S. PATENT DOCUMENTS

| | | | |
|---|---|---|---|
| 2007/0259271 A1 | 11/2007 | Nanno et al. | |
| 2009/0081554 A1 | 3/2009 | Takada et al. | |
| 2009/0197182 A1 | 8/2009 | Katoh | |
| 2009/0226816 A1* | 9/2009 | Yoshida et al. | 429/304 |
| 2011/0027661 A1 | 2/2011 | Okazaki et al. | |

FOREIGN PATENT DOCUMENTS

| | | |
|---|---|---|
| JP | A-2009-023904 | 2/2009 |
| JP | A-2009-181921 | 8/2009 |
| JP | A-2009-193940 | 8/2009 |
| WO | WO 2007/004590 A1 | 1/2007 |

* cited by examiner

Weight ratio of $LiCoO_2$ to $Li_{1.5}Al_{0.5}Ge_{1.5}(PO_4)_3$ in composite particles

METHOD FOR PRODUCING CERAMIC LAMINATE

TECHNICAL FIELD

The present invention relates to a method for producing a ceramic laminate capable of preventing coming-off of materials and warpage of the ceramic laminate.

BACKGROUND ART

A secondary battery is a battery which can discharge the battery by converting a decrease in chemical energy accompanying chemical reaction to electrical energy, and store (charge) the battery by converting electrical energy to chemical energy by applying electrical current in a direction that is opposite to the discharge direction. Among secondary batteries, a lithium secondary battery has been widely applied for power sources for notebook personal computers, cellular phones, etc. since the energy density of the lithium secondary battery is high.

In a lithium secondary battery, if graphite (referred as to "C") is used as a negative electrode active material, the reaction described by the following formula (I) proceeds at a negative electrode upon discharging the battery:

$$Li_xC \rightarrow C + xLi^+ + xe^- \quad (I)$$

wherein, $0 < x < 1$.

Electrons generated by the reaction described by the formula (I) pass through an external circuit, work by an external load, and then reach a positive electrode. Lithium ions ($Li^+$) generated by the reaction described by the formula (I) are transferred by electro-osmosis from the negative electrode side to the positive electrode side through an electrolyte sandwiched between the negative electrode and the positive electrode.

Also, if lithium cobalt oxide ($Li_{1-x}CoO_2$) is used as a positive electrode active material, upon discharging the battery, the reaction described by the following formula (II) proceeds at the positive electrode:

$$Li_{1-x}CoO_2 + xLi^+ + xe^- \rightarrow LiCoO_2 \quad (II)$$

wherein, $0 < x < 1$.

Upon charging the battery, reactions which are reverse to ones described by the above formulae (I) and (II) proceed at the negative and positive electrodes, thereby regenerating graphite into which lithium is inserted ($Li_xC$) by graphite intercalation at the negative electrode, and regenerating lithium cobalt oxide ($Li_{1-x}CoO_2$) at the positive electrode. Because of this, discharging becomes possible again.

A lithium secondary battery comprising a lithium solid electrolyte, a positive electrode active material and a negative electrode active material is produced as follows: a positive electrode active material layer, a lithium solid electrolyte layer and a negative electrode active material layer are laminated in this order to form a laminate, and the laminate is sintered by a heat treatment. By the above sintering, the positive electrode active material layer can adhere to the lithium solid electrolyte layer, and the lithium solid electrolyte layer can adhere to the negative electrode active material layer.

However, in the above-described method for bonding the interfaces by sintering, there has been a possibility that the sintered interface is electrochemically inactivated, the bonding of the interfaces is insufficient, and a side reaction, in which materials which are not contributed to discharging and charging are produced, proceeds at the interface between the active material and the solid electrolyte. Therefore, it is difficult to form an excellent interface between the active material and the solid electrolyte while densifying or crystallizing the active material layer and the solid electrolyte layer by a heat treatment.

As a technique for solving the problem as just described above, Patent Literature 1 discloses a laminate for an all-solid lithium secondary battery comprising an active material layer and a solid electrolyte layer which is bound together with the active material layer by sintering, wherein the active material layer contains the first kind of crystalline material capable of releasing and absorbing lithium ions, the solid electrolyte layer contains the second kind of lithium ion-conductive crystalline material, and when the laminate is analyzed by an X-ray diffraction method, components other than constituents of the active material layer and the solid electrolyte layer are not detected from the laminate.

CITATION LIST

Patent Literature

[Patent Literature 1] Japanese Patent Application Laid-Open (JP-A) No. 2007-5279

SUMMARY OF INVENTION

Technical Problem

Paragraph 121 of Patent Literature 1 discloses that the maximum sintering temperature of a laminate is preferably in the range from 700° C. to 1,000° C. However, such a high-temperature treatment requires huge amount of energy and cost.

The present invention was made in view of the above circumstances, and it is an object of the present invention to provide a method for producing a ceramic laminate capable of preventing coming-off of materials and warpage of the ceramic laminate by a heat treatment at a relatively-low temperature, and a ceramic laminate produced by the production method.

Solution to Problem

The method for producing the ceramic laminate of the present invention is a method for producing a ceramic laminate having a layer structure in which two or more layers are laminated, comprising:

a step of producing a laminate comprising a first layer and a second layer, the first layer containing a solid electrolyte and the second layer containing at least composite particles obtained by covering an electrode active material with the solid electrolyte; and a step of performing a heat treatment on the laminate comprising the first and second layers at a temperature of 500° C. or more and less than 700° C.

In the method for producing the ceramic laminate of the present invention, the step of producing the laminate can comprise:

a step of preparing the first layer containing the solid electrolyte;

a step of preparing the composite particles by covering the electrode active material with the solid electrolyte; and a step of forming the second layer by dispersing at least the composite particles on at least one surface of the first layer.

In the method for producing the ceramic laminate of the present invention, the step of producing the laminate can comprise:

a step of preparing the composite particles by covering the electrode active material with the solid electrolyte;

a step of forming the second layer containing the composite particles; and a step of forming the first layer by dispersing the solid electrolyte on at least one surface of the second layer.

In the method for producing the ceramic laminate of the present invention, the solid electrolyte is preferably a lithium ion-conductive solid electrolyte.

In the method for producing the ceramic laminate of the present invention, the solid electrolyte is preferably a solid electrolyte containing phosphate.

In the method for producing the ceramic laminate of the present invention, the solid electrolyte preferably has a chemical composition represented by the following formula (1):

$$Li_{1+x}Al_xGe_{2-x}(PO_4)_3 \quad \text{Formula (1)}$$

wherein, $0 < x \leq 1$.

In the method for producing the ceramic laminate of the present invention, the electrode active material is preferably a material selected from the group consisting of $LiCoO_2$, $LiMn_2O_4$, $LiNi_{0.5}Mn_{1.5}O_4$, $Li_4Ti_5O_{12}$, $LiFePO_4$ and $Nb_2O_5$.

In the method for producing the ceramic laminate of the present invention, the content of the solid electrolyte in the composite particles is preferably 1 to 10 parts by weight with respect to 100 parts by weight of the electrode active material in the composite particles.

In the method for producing the ceramic laminate of the present invention, the second layer can further contain the solid electrolyte in addition to the composite particles.

In the method for producing the ceramic laminate of the present invention, the total content of the solid electrolyte in the second layer can be 10 to 40 parts by weight with respect to 100 parts by weight of the electrode active material in the second layer.

In the method for producing the ceramic laminate of the present invention, the first layer can contain the solid electrolytes of two or more kinds, and the solid electrolytes of two or more kinds have different degrees of crystallinity.

In the method for producing the ceramic laminate of the present invention, among the solid electrolytes of two or more kinds, the content ratio of the solid electrolyte with a higher degree of crystallinity can be 50 to 90% by weight, when the total content of the solid electrolyte in the first layer is 100% by weight.

The ceramic laminate of the present invention is produced by the production method.

Advantageous Effects of Invention

According to the present invention, by adding the solid electrolytes, which are the same kinds of materials, in the first layer and the second layer, it is possible to produce a ceramic laminate capable of preventing coming-off of the materials and warpage of the ceramic laminate even by performing a heat treatment at a relatively-low temperature of less than 700° C. Also, according to the present invention, by adding composite particles obtained by covering the electrode active material with the solid electrolyte in the second layer, unlike the case where the solid electrolyte is simply mixed with the electrode active material, the composite particles are in contact with each other via the solid electrolyte upon forming the second layer, thereby proceeding with the heat treatment at a relatively-low temperature of less than 700° C.

DESCRIPTION OF EMBODIMENTS

Figure 1:
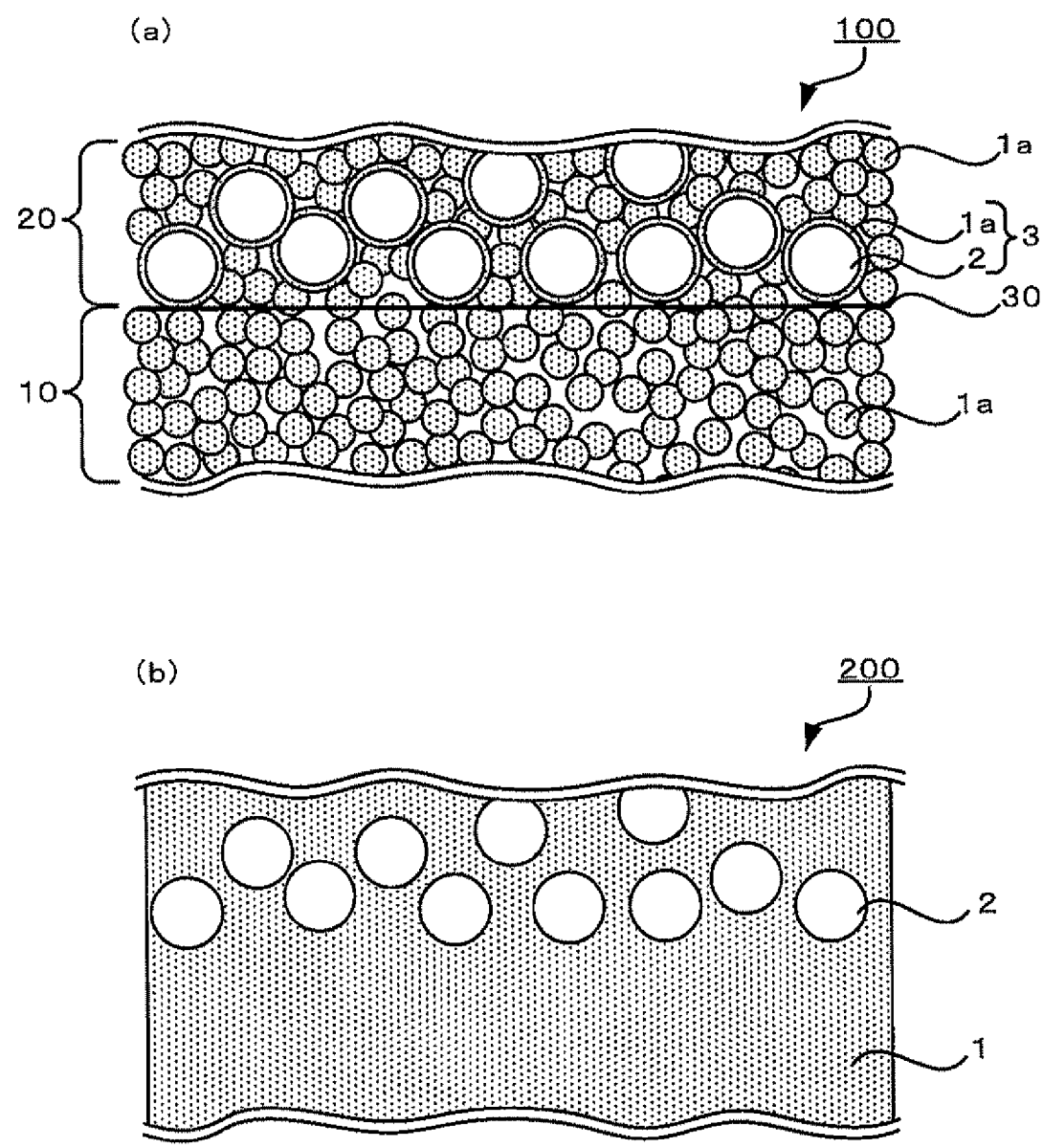
FIG. 1 is a view schematically showing sections of laminates before and after a heat treatment cut along the layer stacking direction in the first typical example of the present invention.

The method for producing the ceramic laminate of the present invention is a method for producing a ceramic laminate having a layer structure in which two or more layers are laminated, comprising:

a step of producing a laminate comprising a first layer and a second layer, the first layer containing a solid electrolyte and the second layer containing at least composite particles obtained by covering an electrode active material with the solid electrolyte; and a step of performing a heat treatment on the laminate comprising the first and second layers at a temperature of 500° C. or more and less than 700° C.

As disclosed in Claim 1 of Patent Literature 1, in the above-described conventional art, a crystalline active material and a crystalline solid electrolyte are used. The laminate disclosed in Patent Literature 1 comprises those different kinds of crystalline materials, so that the high temperature condition (700° C. to 1,000° C.) is essential for proceeding with sintering. However, as described above, huge amount of energy and cost is required for securing such a high temperature condition.

As a result of diligent effort, the inventors of the present invention have developed the method for producing multi-layer ceramics in which sintering proceeds even at a relatively-low temperature by employing a layer containing composite particles covered with a low-crystalline solid electrolyte material and a layer containing a low-crystalline solid electrolyte material as a layer structure of the ceramic laminate. This has been achieved by adding the same kinds of low-crystalline solid electrolyte materials in different layers. In the ceramic laminate produced by the above production method, the ratio of unsintered part in the laminate is significantly low, thereby causing far less coming-off of ceramic components in the laminate after sintering.

Also in the conventional art, each of layers constituting the multilayer ceramics has a different heat contraction percentage. Therefore, in order to sinter a ceramic multilayer substrate without causing warpage, a constrained layer needs to be disposed and a ceramic multilayer substrate needs to be sintered while applying pressure. Accordingly, extra steps and cost are required.

As a result of diligent effort, the inventors of the present invention have developed the method for producing multilayer ceramics having significantly-small warpage after a heat treatment by employing a layer containing composite particles covered with a low-crystalline solid electrolyte material and a layer containing two or more kinds of solid electrolyte materials having different degrees of crystallinity as a layer structure of the ceramic laminate. This has been achieved by adding the same kinds of solid electrolyte materials having different degrees of crystallinity in the same layer, thereby controlling heat contraction upon the heat treatment. The ceramic laminate produced by the above production method has significantly-small warpage after sintering, so that the ceramic laminate could rarely break even when the pressure is applied from the outside of the ceramic laminate, thereby obtaining a reliable battery when the laminate is used for a lithium secondary battery.

The production method of the present invention comprises: (1) a step of preparing a laminate comprising the first layer and the second layer; and (2) a step of performing a heat treatment on the laminate.

The present invention is not limited to the above-described two steps only, and can comprise, for example, a step of laminating the third layer after the above-described two steps, etc. in addition to the above-described two steps.

Hereinafter, the steps (1) and (2), and other steps will be described in order.

(1) Step of Preparing Laminate Comprising the First Layer and the Second Layer

The present step is a step of producing a laminate comprising the first layer and the second layer, the first layer containing a solid electrolyte and the second layer containing at least composite particles obtained by covering an electrode active material with the solid electrolyte.

In the present step, the laminating order of the first layer and the second layer is not particularly limited. Therefore, after preparing the first layer, the second layer can be formed by dispersing a material of the second layer on the first layer. To the contrary, after preparing the second layer, the first layer can be formed by dispersing a material of the first layer on the second layer. In addition, the first layer and the second layer are formed separately, and then the layers are attached to each other to form a laminate.

More specifically, the following two embodiments can be exemplified. However, the present step is not limited to the following two embodiments only.

The first embodiment of the present step is the embodiment comprising: a step of preparing the first layer containing a solid electrolyte; a step of preparing composite particles by covering an electrode active material with the solid electrolyte; and a step of forming the second layer by dispersing at least the composite particles on at least one surface of the first layer.

The second embodiment of the present step is the embodiment comprising: a step of preparing composite particles by covering an electrode active material with a solid electrolyte; a step of forming the second layer containing the composite particles; and a step of forming the first layer by dispersing the solid electrolyte on at least one surface of the second layer.

Hereinafter, the first embodiment will be described. The only difference between the first and second embodiments is laminating order, and the second embodiment is not essentially different from the first embodiment. Thus, the following description can be appropriately applied for the second embodiment.

The first embodiment of the present step comprises: (1-1) a step of preparing the first layer; (1-2) a step of preparing composite particles; and (1-3) a step of forming the second layer on the first layer.

Hereinafter, the above-described steps (1-1) to (1-3) will be described in order.

(1-1) Step of Preparing the First Layer

The present step is a step of preparing the first layer containing a solid electrolyte.

The solid electrolyte used in the present invention is preferably a material having ion conductivity and insulation property. In particular, the solid electrolyte is more preferably a lithium ion-conductive solid electrolyte. By using the lithium ion-conductive solid electrolyte in the production method of the present invention, the ceramic laminate produced by the production method can be used for, for example, the active material layer of a lithium secondary battery.

Also, from the point of view that sintering proceeds even by applying heat at a temperature of less than 700° C. to the laminate in the step of the heat treatment described below, thereby obtaining a ceramic laminate, the solid electrolyte is preferably a solid electrolyte containing phosphate.

From the view point of having all characteristics described above, the solid electrolyte is preferably a solid electrolyte having a chemical composition represented by the following formula (1):

$$Li_{1+x}Al_xGe_{2-x}(PO_4)_3 \quad \text{Formula (1)}$$

wherein, $0 < x \le 1$.

The solid electrolyte used in the present step preferably has a low crystallinity. "low crystallinity" as used herein refers to property having low degree of crystalline order despite having degree of crystalline order which is higher than that in the amorphous state. Specifically, the solid electrolyte refers to a material in which the S/N (signal/noise) ratio of an XRD pattern of crystal increases after the heat treatment.

The solid electrolyte used in the present step is preferably in the form of a particle. The solid electrolyte particles preferably have an average particle diameter of 30 to 1,000 nm. If the average particle diameter of the solid electrolyte particles is less than 30 nm, handling is difficult. If the average particle diameter of the solid electrolyte particles is more than 1,000 nm, it is difficult to produce a ceramic laminate having an appropriate thickness.

The average particle diameter of solid electrolyte particles is calculated by the conventional method. An example of the method of calculating the average particle diameter of the particles is as follows. Firstly, the particle diameter of one particle is calculated in a TEM (transmission electron microscope) image at a magnification of 400,000 or 1,000,000 when the particle is regarded as a spherical particle. Such a calculation of the particle diameter by the TEM observation is performed on the same kinds of 200 to 300 particles to define the average of these particles as the average particle diameter.

In the present step, the first layer contains the solid electrolytes of two or more kinds, and the solid electrolytes of two or more kinds can have different degrees of crystallinity.

"degree of crystallinity" as used herein refers to degree of crystallization progress. Specifically, "degree of crystallinity" is defined by the change of the above-described S/N (signal/noise) ratio of the XRD pattern of crystal.

In the heat treatment step described below, a low-crystalline solid electrolyte is converted into a high-crystalline solid electrolyte. In this case, the lower crystalline solid electrolyte tends to have a higher heat contraction percentage. Therefore, by mixing the solid electrolytes of two or more kinds having different degrees of crystallinity into the first layer, the difference in heat contraction percentage between the first and second layers can be reduced, thereby causing no warpage after the heat treatment.

In the case of employing the solid electrolytes of two or more kinds having different degrees of crystallinity, among the solid electrolytes of two or more kinds, the content ratio of the solid electrolyte with a higher degree of crystallinity is preferably 50 to 90% by weight, when the total content of the solid electrolyte in the first layer is 100% by weight. If the content ratio of the solid electrolyte with a higher degree of crystallinity is less than 50% by weight, the content ratio of the solid electrolyte with a higher degree of crystallinity is too low. Therefore, the difference in heat contraction percentage between the first and second layers is too large, so that the effect of causing no warpage after sintering, which is the effect of the present invention, cannot be sufficiently obtained. If the content ratio of the solid electrolyte with a higher degree of crystallinity is more than 90% by weight, as described in Examples, formability of the laminate before the heat treatment step becomes insufficient.

Among the solid electrolytes of two or more kinds, the content ratio of the solid electrolyte with a higher degree of crystallinity is more preferably 60 to 85% by weight, further more preferably 70 to 80% by weight, when the total content of the solid electrolyte in the first layer is 100% by weight.

The method for forming the first layer is not particularly limited, and known methods can be employed.

Specifically, there may be mentioned a method comprising the steps of producing a pellet having an appropriate diameter using one or more kinds of solid electrolytes; and defining the pellet as the first layer.

Other examples of the method for forming the first layer include a screen printing method, a sputtering method and a laser ablation method, but not limited to thereto.

The thickness of the first layer is not particularly limited, and can be adjusted according to the purpose of the ceramic laminate.

For example, in the case that the ceramic laminate produced by the production method of the present invention is used for the member of a lithium secondary battery, the first layer preferably has a thickness of 1 to 15 μm.

The first layer can contain materials other than the solid electrolyte. The content ratio of the materials is preferably 3% by weight or less, more preferably 1% by weight or less, and it is further preferable that the first layer comprises only the solid electrolyte, when the total weight of the first layer is 100% by weight.

(1-2) Step of Preparing Composite Particles

The present step is a step of preparing composite particles obtained by covering an electrode active material with the above-described solid electrolyte. The solid electrolyte preferably has a low crystallinity described above.

The electrode active material preferably has ion conductivity.

Specifically, the electrode active material is preferably a material selected from the group consisting of $LiCoO_2$, $LiMn_2O_4$, $LiNi_{0.5}Mn_{1.5}O_4$, $Li_4Ti_5O_{12}$, $LiFePO_4$ and $Nb_2O_5$.

The content of the solid electrolyte in the composite particles is preferably 1 to 10 parts by weight with respect to 100 parts by weight of the electrode active material in the composite particles. If the content of the solid electrolyte is less than 1 part by weight, the content ratio of the solid electrolyte is too low. Therefore, sintering does not proceed sufficiently in the heat treatment step described below, so that the residual ratio of ceramics after the heat treatment could decrease as described in Examples. If the content of the solid electrolyte is more than 10 parts by weight, the solid electrolyte aggregates, resulting in coming-off of the solid electrolyte from the surface of the electrode active material. Thereby, as described in Examples, the residual ratio of ceramics after the heat treatment could decrease.

The content of the solid electrolyte in the composite particles is more preferably 3 to 8 parts by weight with respect to 100 parts by weight of the electrode active material in the composite particles.

The method for producing composite particles obtained by covering the electrode active material with the solid electrolyte is not particularly limited, and known methods can be employed.

Specifically, the composite particles can be produced by mixing appropriate amounts of the solid electrolyte and the electrode active material. Examples of the mixing method include mechanofusion, a spray dry method and a sol-gel method. The mixing time can be appropriately selected, and is preferably from 10 minutes to 5 hours.

In the composite particles, the electrode active material does not necessarily need to be completely covered with the solid electrolyte. Also, the covering on the electrode active material is not required to be uniform.

FIG. 4(a) is a TEM photograph of one of the composite particles obtained by covering $LiCoO_2$ used as the electrode active material with low-crystalline $Li_{1.5}Al_{0.5}Ge_{1.5}(PO_4)_3$ (hereinafter may be referred to as "LAGP") used as the solid electrolyte. FIG. 4(b) shows one of the composite particles in which part of $LiCoO_2$ being a core, which has a low curvature, is relatively thickly covered with LAGP. On the other hand, FIG. 4(c) shows one of the composite particles in which part of $LiCoO_2$, which has a high curvature, is relatively thinly covered with LAGP, or not completely covered with LAGP. The composite particles can provide the effect of the present invention even in the above-mentioned covering states.

The electrode active material used in the present step is preferably in the form of a particle. The electrode active material particles preferably have an average particle diameter of 3 to 15 μm. If the average particle diameter of the electrode active material particles is less than 3 μm, handling is difficult. If the average particle diameter of the solid electrolyte particles is more than 15 μm, it is difficult to produce composite particles having an appropriate average particle diameter.

Figure 4:
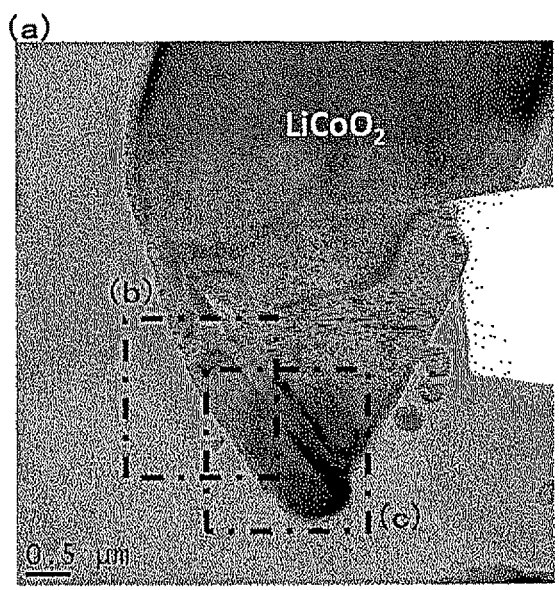
FIG. 4 is a TEM photograph of one of composite particles obtained by covering $LiCoO_2$ with low-crystalline .
Figure 4:
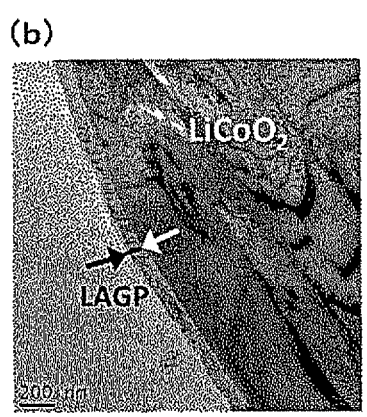
Figure 4:
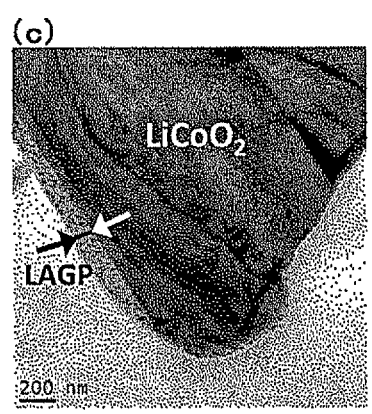

The composite particles prepared in the present step preferably have an average particle diameter of 3 to 15 μm. That is, it is preferable that the average particle diameter of the composite particles is roughly the same as that of the electrode active material particles, which will be a material for the composite particles. As shown in FIG. 4, this can be also understood from the very thin thickness (about 50 to 150 nm) of the solid electrolyte layer covering the electrode active material particles to the average particle diameter of the composite particles. If the average particle diameter of the composite particles is less than 3 μm, handling is difficult. If the average particle diameter of the composite particles is more than 15 μm, dispersibility is poor, so that layer formation could be difficult.

The average particle diameter of the electrode active material particles and the composite particles can be calculated similarly as in the above-described solid electrolyte particles.

(1-3) Step of Forming the Second Layer on the First Layer

The present step is a step of forming the second layer by dispersing at least the above-described composite particles on at least one surface of the above-described first layer.

The method for dispersing the composite particles on the first layer is not particularly limited, and known methods can be employed.

Specifically, the second layer can be formed by uniformly applying an appropriate amount of composite particles or a slurry containing the particles on at least one surface of the first layer. After forming the laminate, it is preferable to press the laminate by applying an appropriate pressure in its layer stacking direction to bind interfaces together.

Other examples of the method for dispersing composite particles on the first layer include a dry pressing method and a spin-coating method, but not limited to thereto.

The thickness of the second layer is not particularly limited, and can be adjusted according to the purpose of the ceramic laminate.

For example, in the case that the ceramic laminate produced by the production method of the present invention is used for the member of a lithium secondary battery, the second layer preferably has a thickness of 1 μm to 1 mm.

In the present step, in addition to the composite particles, the solid electrolyte described above can be dispersed on at least one surface of the first layer. In this case, the solid electrolyte is preferably a low-crystalline solid electrolyte.

In the case that the second layer contains the solid electrolyte in addition to the composite particles, the total content of the solid electrolyte in the second layer is preferably 5 to 50 parts by weight with respect to 100 parts by weight of the electrode active material in the second layer. "The total content of the solid electrolyte in the second layer" as used herein refers to a sum of the content of solid electrolyte contained in the composite particles and the content of solid electrolyte not contained in the composite particles in the second layer. If the content of the solid electrolyte is less than 5 parts by weight, the content ratio of the solid electrolyte is too low. Therefore, sintering does not proceed sufficiently in the heat treatment step described below, so that the residual ratio of ceramics after the heat treatment could decrease as described in Examples. If the content of the solid electrolyte is more than 50 parts by weight, the total content of the electrode active material in the second layer decreases. Therefore, if the produced ceramic laminate is incorporated into a battery, energy density of the battery could decrease.

In such an embodiment, the total content of the solid electrolyte in the second layer is more preferably 10 to 40 parts by weight, still more preferably 20 to 30 parts by weight, with respect to 100 parts by weight of the electrode active material in the second layer.

The second layer can contain materials other than the above-described composite particles and solid electrolyte. The content ratio of the materials is preferably 3% by weight or less, more preferably 1% by weight or less, still more preferably 0% by weight, when the total weight of the second layer is 100% by weight.

(2) Step of Performing Heat Treatment on Laminate

The present step is a step of performing a heat treatment on the above-described laminate comprising the first and second layers at a temperature of 500° C. or more and less than 700° C.

Unlike the conventional art, one of major effects of the present invention is that the heat treatment of the laminate completely proceeds even at a temperature of less than 700° C. However, the heat treatment could be incomplete at a temperature of less than 500° C.

The heat treatment step is preferably performed at a temperature of 550° C. or more and 650° C. or less, more preferably performed at a temperature of 600° C.

The method for performing the heat treatment is not particularly limited, and known methods can be employed. A specific example of the method for performing the heat treatment includes sintering.

Other examples of the method for performing the heat treatment on the laminate include a hot press method, a spark plasma sintering method and a microwave heating method.

A time for the heat treatment varies depending on temperature conditions, and is preferably about 0.5 to 5 hours. The heat treatment can be performed several times.

(3) Other Steps

In addition to the above-described steps (1) and (2), the present invention can comprise, for example, a step of laminating the third layer after the above-described two steps, and a step of further laminating a current collector metal layer.

The third layer as used herein refers to a layer containing a positive electrode active material or a negative electrode active material. Thereby, it is possible to provide a battery in which three layers, a positive electrode layer, a solid electrolyte layer and a negative electrode layer, are laminated.

Furthermore, by laminating the current collector metal layer made of aluminum metal, stainless or metal nickel on the positive electrode layer and the negative electrode layer, a battery is completed.

Hereinafter, a typical example of the production method of the present invention will be described using figures.

FIG. 1 is a view schematically showing sections of laminates before and after a heat treatment cut along the layer stacking direction in the first typical example of the present invention. The double wavy line shown in the figure indicates the omission of a part of the figure.

FIG. 1 (a) is a schematic sectional view showing a laminate before a heat treatment step. Laminate 100 before the heat treatment step comprises first layer 10 and second layer 20. First layer 10 comprises low-crystalline solid electrolyte 1a. Second layer 20 adjacent to first layer 10 via interface 30 contains composite particles 3 obtained by covering electrode active material 2 with low-crystalline solid electrolyte 1a in addition to low-crystalline solid electrolyte 1a. In FIG. 1 (a), a section of composite particles 3 is schematically shown.

FIG. 1 (b) is a schematic sectional view showing a ceramic laminate after the heat treatment step. Laminate 200 after the heat treatment step comprises layer 1 made of continuous solid electrolyte and electrode active material 2 which is intermittently present.

Similarly as in the first typical example of the present invention, by adding the solid electrolytes, which are the same kinds of materials, in the first layer and the second layer, the heat treatment sufficiently proceeds even at a relatively-low temperature of less than 700° C., thereby producing the ceramic laminate capable of preventing coming-off of the materials. Also, similarly as in the first typical example of the present invention, by adding composite particles in the second layer, unlike the case where the solid electrolyte is simply mixed with the electrode active material, the composite particles are in contact with each other via the solid electrolyte upon forming the second layer, thereby proceeding with the heat treatment at a relatively-low temperature of less than 700° C.

Figure 2:
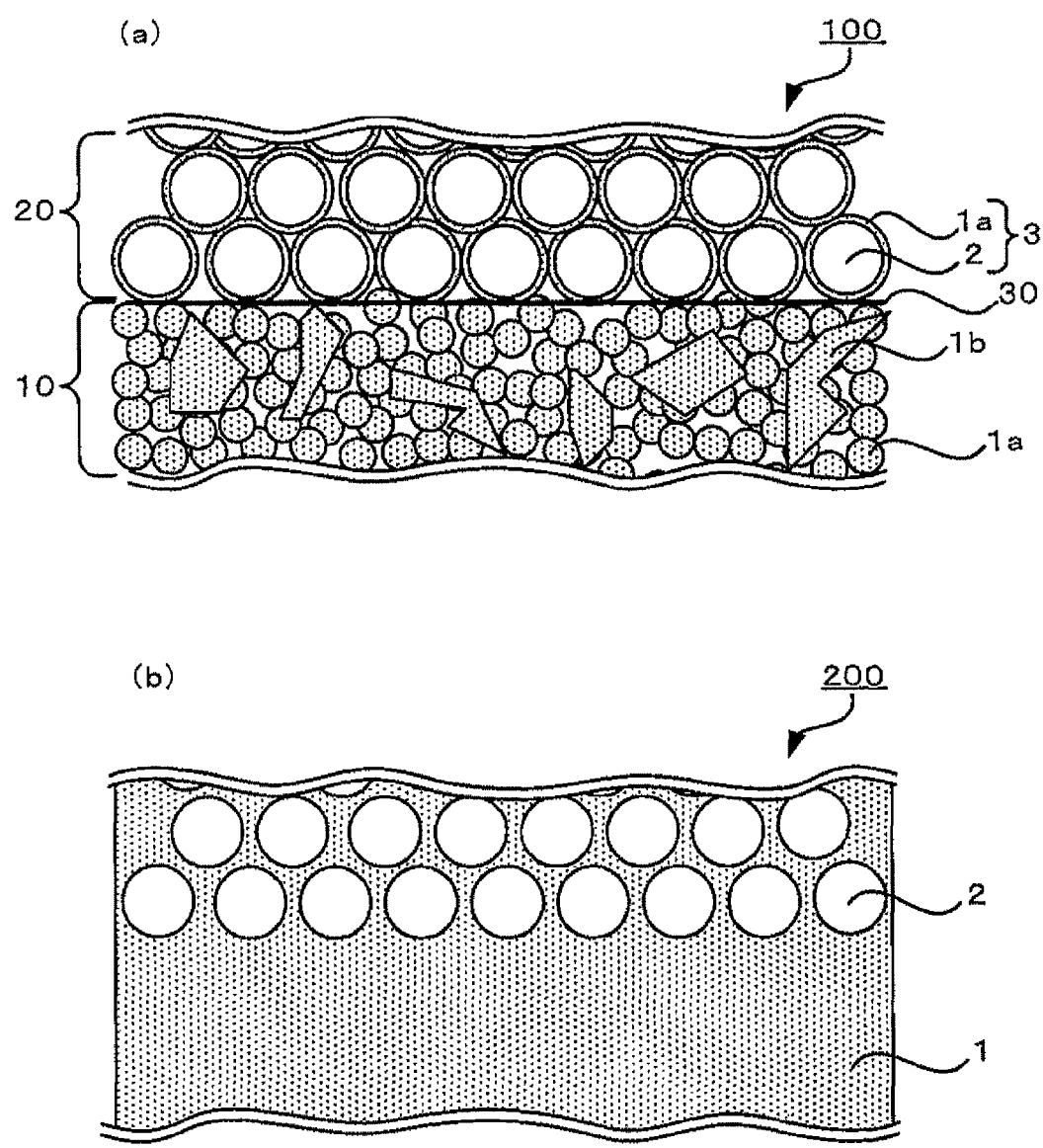
FIG. 2 is a view schematically showing sections of laminates before and after a heat treatment cut along the layer stacking direction in the second typical example of the present invention.

FIG. 2 is a view schematically showing sections of laminates before and after a heat treatment cut along the layer stacking direction in the second typical example of the present invention. The double wavy line shown in the figure indicates the omission of a part of the figure.

FIG. 2 (a) is a schematic sectional view showing a laminate before the heat treatment step. Laminate 100 before the heat treatment step comprises first layer 10 and second layer 20. First layer 10 comprises low-crystalline solid electrolyte 1a and solid electrolyte 1b having higher degree of crystallinity than that of solid electrolyte 1a. Second layer 20 adjacent to first layer 10 via interface 30 contains composite particles 3 obtained by covering electrode active material 2 with low-crystalline solid electrolyte 1a. In FIG. 2 (a), a section of composite particles 3 is schematically shown.

FIG. 2 (b) is a schematic sectional view showing a ceramic laminate after the heat treatment step. Laminate 200 after the heat treatment step comprises layer 1 made of continuous solid electrolyte and electrode active material 2 which is intermittently present.

Similarly as in the second typical example of the present invention, by adding the same kinds of solid electrolyte materials having different degrees of crystallinity in the first layer, heat contraction upon heat treatment can be controlled, thereby producing the ceramic laminate having significantly-small warpage after the heat treatment. Also, similarly as in the second typical example of the present invention, by adding the composite particles in the second layer, unlike the case where the solid electrolyte is simply mixed with the electrode active material, the composite particles are in contact with each other via the solid electrolyte upon forming the second layer, thereby proceeding with the heat treatment at a relatively-low temperature of less than 700° C.

A feature of the ceramic laminate of the present invention is that the ceramic laminate is produced by the above-described production method.

In the description of the above-described production method, the laminate comprising two layers only is mainly described; however, the ceramic laminate of the present invention can comprise three or more layers. Specifically, the ceramic laminate of the present invention can be a laminate obtained by performing a heat treatment on the laminate comprising three or more layers, which is obtained by alternately laminating the first layer and the second layer, or a laminate obtained by performing a heat treatment on the laminate comprising other layers other than the above-described first and second layers.

EXAMPLES

Hereinafter, the present invention will be described further in detail with reference to examples and comparative examples. However, the scope of the present invention is not limited to the following examples.

Example 1

1-1. Production of Low-Crystalline $Li_{1.5}Al_{0.5}Ge_{1.5}(PO_4)_3$

Amorphous $Li_{1.5}Al_{0.5}Ge_{1.5}(PO_4)_3$ powder (manufactured by: Hosokawa Micron Corporation; average particle diameter: 50 nm) was heated for 4 hours at 120° C. to obtain low-crystalline $Li_{1.5}Al_{0.5}Ge_{1.5}(PO_4)_3$.

Figure 3:
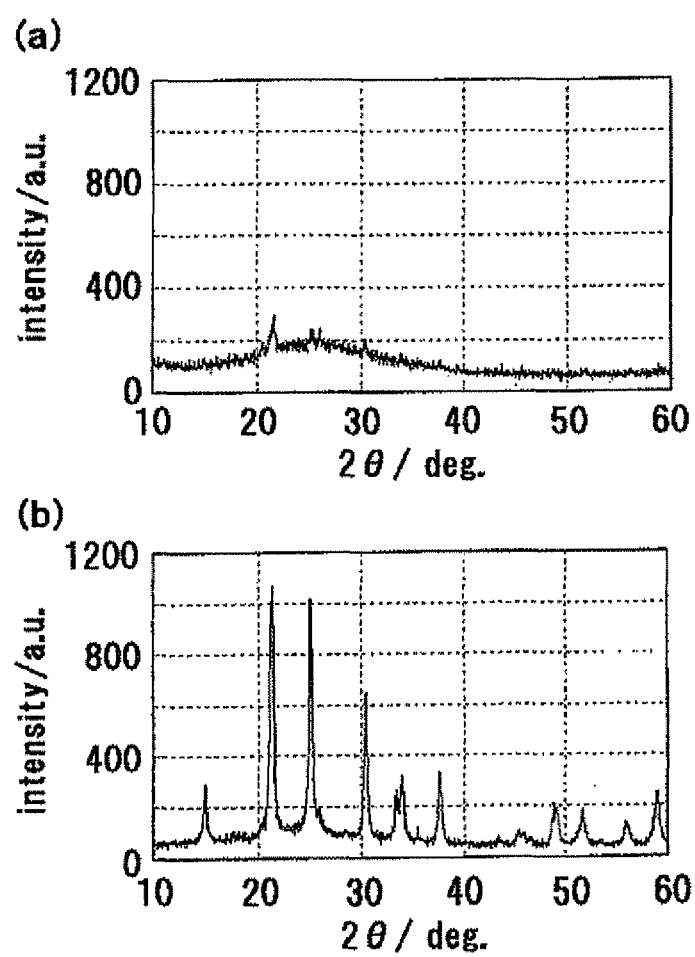
FIG. 3 is a view showing XRD patterns of low crystalline $Li_{1.5}Al_{0.5}Ge_{1.5}(PO_4)_3$ before and after sintering.

FIG. 3 (a) shows a XRD pattern of low-crystalline $Li_{1.5}Al_{0.5}Ge_{1.5}(PO_4)_3$ before sintering. As shown in FIG. 3 (a), in the XRD pattern, diffraction peaks were observed at 2θ=around 22°, 26° and 30°; however, the S/N ratio was generally low. Therefore, it can be understood that the crystal obtained only by heating amorphous $Li_{1.5}Al_{0.5}Ge_{1.5}(PO_4)_3$ powder for 4 hours at 120° C. had low degree of crystalline order.

1-2. Production of Composite Particles Obtained by Covering $LiCoO_2$ with Low-Crystalline $Li_{1.5}Al_{0.5}Ge_{1.5}(PO_4)_3$ $LiCoO_2$ powder (manufactured by: Toda Kogyo Corporation; average particle diameter: 10 μm) and amorphous $Li_{1.5}Al_{0.5}Ge_{1.5}(PO_4)_3$ powder (manufactured by: Hosokawa Micron Corporation; average particle diameter: 50 nm) were weighed out so that the weight ratio of $LiCoO_2$ powder to amorphous $Li_{1.5}Al_{0.5}Ge_{1.5}(PO_4)_3$ powder was 100:1, and treated for 30 minutes by means of Mechanofusion (product name; manufactured by: Hosokawa Micron Corporation). TEM photographs of one of the composite particles obtained as described above are shown in FIG. 4.

FIG. 4 (a) is a TEM photograph of one of the particles obtained by covering the surface of $LiCoO_2$ with $Li_{1.5}Al_{0.5}Ge_{1.5}(PO_4)_3$. FIGS. 4 (b) and (c) are magnifications of parts enclosed by chain line in FIG. 4 (a). "LAGP" in each of figures refers to $Li_{1.5}Al_{0.5}Ge_{1.5}(PO_4)_3$.

As shown in FIGS. 4 (a) to (c), the outer shell of $Li_{1.5}Al_{0.5}Ge_{1.5}(PO_4)_3$ was about 50 to 150 nm. Also, as shown in FIG. 4 (b), part of $LiCoO_2$ being a core, which has a low curvature, was relatively thickly covered with $Li_{1.5}Al_{0.5}Ge_{1.5}(PO_4)_3$. On the other hand, as shown an FIG. 4 (c), part of $LiCoO_2$ being a core, which has a high curvature, was relatively thinly covered with $Li_{1.5}Al_{0.5}Ge_{1.5}(PO_4)_3$ or not covered with $Li_{1.5}Al_{0.5}Ge_{1.5}(PO_4)_3$.

1-3. Production of Laminate 1-3-1. Production of the First Layer

Using 300 mg of low-crystalline $Li_{1.5}Al_{0.5}Ge_{1.5}(PO_4)_3$ produced by the above method, a pellet having a diameter of φ13 mm was produced and thus produced pellet was defined as the first layer.

1-3-2. Preparation of Material for the Second Layer

A mixture, which will be a material for the second layer, was prepared by mixing the composite particles produced by the above method and the low-crystalline $Li_{1.5}Al_{0.5}Ge_{1.5}(PO_4)_3$ produced by the above method so that the weight ratio of $LiCoO_2$ to $Li_{1.5}Al_{0.5}Ge_{1.5}(PO_4)_3$ was 100:20 of the total weight of the mixture.

1-3-3. Production of the Second Layer and Sintering of Laminate 30 mg of the mixture, which will be a material for the second layer, was uniformly dispersed on the first layer produced by the above method, and thus obtained laminate was pressed by applying pressure of 6 MPa in its layer stacking direction to produce a laminate comprising the first layer and the second layer. Thus produced laminate was sintered for 2 hours at a temperature of 600° C. to obtain a ceramic laminate of Example 1.

FIG. 3 (b) shows a XRD pattern of $Li_{1.5}Al_{0.5}Ge_{1.5}(PO_4)_3$ after sintering. As shown in FIG. 3 (b), in the XRD pattern, diffraction peaks were observed at 2θ=15°, 33°, 38°, 49°, 52°, 57° and 59°, in addition to diffraction peaks at 2θ=22°, 26° and 30', which were observed in FIG. 3 (a). Also, the S/N ratio was generally high. Therefore, it can be understood that the crystal obtained as a result of sintering low-crystalline $L_5Al_{0.5}Ge_{1.5}(PO_4)_3$ for 2 hours at 600° C. had high degree of crystalline order.

Example 2

A ceramic laminate of Example 2 was obtained by the same method as in Example 1 except that the weight ratio of $LiCoO_2$ to $Li_{1.5}Al_{0.5}Ge_{1.5}(PO_4)_3$ in the composite particles was 100:5 in the above "1-2".

Example 3

A ceramic laminate of Example 3 was obtained by the same method as in Example 1 except that the weight ratio of $LiCoO_2$ to $Li_{1.5}Al_{0.5}Ge_{1.5}(PO_4)_3$ in the composite particles was 100:10 in the above "1-2".

Example 4

A ceramic laminate of Example 4 was obtained by the same method as in Example 1 except that the weight ratio of $LiCoO_2$ to $Li_{1.5}Al_{0.5}Ge_{1.5}(PO_4)_3$ in the mixture, which will be a material for the second layer, was 100:30 in the above "1-3-2".

Example 5

A ceramic laminate of Example 5 was obtained by the same method as in Example 1 except that the weight ratio of $LiCoO_2$ to $Li_{1.5}Al_{0.5}Ge_{1.5}(PO_4)_3$ in the composite particles was 100:5 in the above "1-2", and the weight ratio of $LiCoO_2$ to $Li_{1.5}Al_{0.5}Ge_{1.5}(PO_4)_3$ in the mixture, which will be a material for the second layer, was 100:30 in the above "1-3-2".

Example 6

A ceramic laminate of Example 6 was obtained by the same method as in Example 1 except that the weight ratio of $LiCoO_2$ to $Li_{1.5}Al_{0.5}Ge_{1.5}(PO_4)_3$ in the composite particles was 100:10 in the above "1-2", and the weight ratio of $LiCoO_2$ to $Li_{1.5}Al_{0.5}Ge_{1.5}(PO_4)_3$ in the mixture, which will be a material for the second layer, was 100:30 in the above "1-3-2".

Comparative Example 1

A ceramic laminate of Comparative Example 1 was obtained by the same method as in Example 1 except that the step described in the above "1-2" was omitted, and a mixture, which will be a material for the second layer, was prepared by mixing $LiCoO_2$ powder (manufactured by: Toda Kogyo Corporation; average particle diameter: 10 μm) and low-crystalline $Li_{1.5}Al_{0.5}Ge_{1.5}(PO_4)_3$ produced by the above method so that the weight ratio of $LiCoO_2$ to $Li_{1.5}Al_{0.5}Ge_{1.5}(PO_4)_3$ was 100:20 of the total weight of the mixture in the above "1-3-2".

Comparative Example 2

A ceramic laminate of Comparative Example 2 was obtained by the same method as in Example 1 except that the step described in the above "1-2" was omitted, and a mixture, which will be a material for the second layer, was prepared by mixing $LiCoO_2$ powder (manufactured by: Toda Kogyo Corporation; average particle diameter: 10 μm) and low-crystalline $Li_{1.5}Al_{0.5}Ge_{1.5}(PO_4)_3$ produced by the above method so that the weight ratio of $LiCoO_2$ to $Li_{1.5}Al_{0.5}Ge_{1.5}(PO_4)_3$ was 100:30 of the total weight of the mixture in the above "1-3-2".

Example 7

Figure 5:
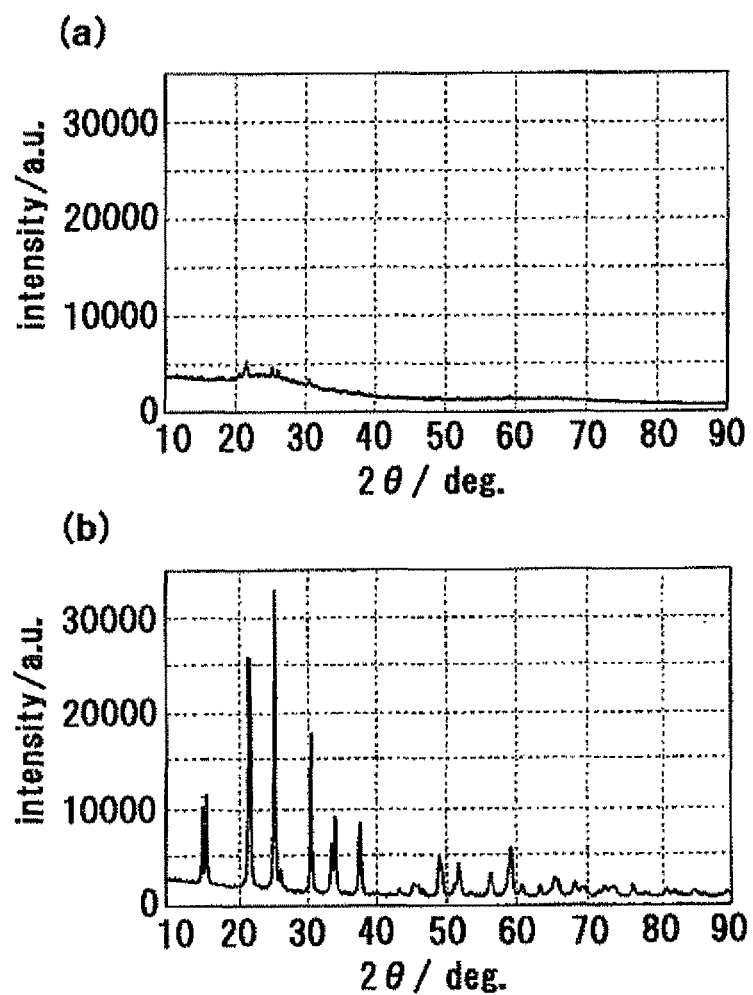
FIG. 5 is a view showing XRD patterns of low crystalline $Li_{1.5}Al_{0.5}Ge_{1.5}(PO_4)_3$ and high crystalline $Li_{1.5}Al_{0.5}Ge_{1.5}(PO_4)_3$.

2-1. Production of Low-Crystalline $Li_{1.5}Al_{0.5}Ge_{1.5}(PO_4)_3$ and High-Crystalline $Li_{1.5}Al_{0.5}Ge_{1.5}(PO_4)_3$ Low-crystalline $Li_{1.5}Al_{0.5}Ge_{1.5}(PO_4)_3$ was produced by the same method described in the above "1-1". FIG. 5 (a) shows a XRD pattern of low-crystalline $Li_{1.5}Al_{0.5}Ge_{1.5}(PO_4)_3$. FIG. 5 (a) shows a XRD pattern similar to that in FIG. 3 (a).

A heat treatment was performed on the low-crystalline $Li_{1.5}Al_{0.5}Ge_{1.5}(PO_4)_3$ for 2 hours at 900° C. Then, the solid obtained after the heat treatment was pulverized in a mortar and passed through a sieve having 200 meshes, and thus obtained powder was defined as high-crystalline $Li_{1.5}Al_{0.5}Ge_{1.5}(PO_4)_3$. FIG. 5 (b) shows a XRD pattern of high-crystalline $Li_{1.5}Al_{0.5}Ge_{1.5}(PO_4)_3$. FIG. 5 (b) shows a XRD pattern similar to that in FIG. 3 (b).

2-2. Production of Composite Particles Obtained by Covering $LiCoO_2$ with Low Crystalline $Li_{1.5}Al_{0.5}Ge_{1.5}(PO_4)_3$ The composite particles were produced by the same method described in the above "1-2".

2-3. Production of Laminate 2-3-1. Production of the First Layer

Low-crystalline $Li_{1.5}Al_{0.5}Ge_{1.5}(PO_4)_3$ and high-crystalline $Li_{1.5}Al_{0.5}Ge_{1.5}(PO_4)_3$ were mixed at a weight ratio of 50:50. Using 300 mg of thus obtained mixed powder, a pellet having a diameter of φ13 mm was produced and thus produced pellet was defined as the first layer.

2-3-2. Production of the Second Layer and Sintering of Laminate 20 mg of the composite particles produced by the above method was uniformly dispersed on the first layer produced by the above method, and thus obtained laminate was pressed by applying pressure of 6 MPa in its layer stacking direction to produce a laminate comprising the first layer and the second layer. Thus produced laminate was sintered for 2 hours at a temperature of 600° C. to obtain a ceramic laminate of Example 7.

Example 8

A ceramic laminate of Example 8 was obtained by the same method as in Example 7 except that low-crystalline $Li_{1.5}Al_{0.5}Ge_{1.5}(PO_4)_3$ and high-crystalline $Li_{1.5}Al_{0.5}Ge_{1.5}(PO_4)_3$ were mixed at a weight ratio of 40:60 in the above "2-3-1".

Example 9

A ceramic laminate of Example 9 was obtained by the same method as in Example 7 except that low-crystalline $Li_{1.5}Al_{0.5}Ge_{1.5}(PO_4)_3$ and high-crystalline $Li_{1.5}Al_{0.5}Ge_{1.5}(PO_4)_3$ were mixed at a weight ratio of 30:70 in the above "2-3-1".

Example 10

A ceramic laminate of Example 10 was obtained by the same method as in Example 7 except that low-crystalline $Li_{1.5}Al_{0.5}Ge_{1.5}(PO_4)_3$ and high-crystalline $Li_{1.5}Al_{0.5}Ge_{1.5}(PO_4)_3$ were mixed at a weight ratio of 25:75 in the above "2-3-1".

Example 11

A ceramic laminate of Example 11 was obtained by the same method as in Example 7 except that low-crystalline $Li_{1.5}Al_{0.5}Ge_{1.5}(PO_4)_3$ and high-crystalline $Li_{1.5}Al_{0.5}Ge_{1.5}(PO_4)_3$ were mixed at a weight ratio of 20:80 in the above "2-3-1".

Example 12

A ceramic laminate of Example 12 was obtained by the same method as in Example 7 except that low-crystalline $Li_{1.5}Al_{0.5}Ge_{1.5}(PO_4)_3$ and high-crystalline $Li_{1.5}Al_{0.5}Ge_{1.5}(PO_4)_3$ were mixed at a weight ratio of 15:85 in the above "2-3-1".

Example 13

A ceramic laminate of Example 13 was obtained by the same method as in Example 7 except that low-crystalline $Li_{1.5}Al_{0.5}Ge_{1.5}(PO_4)_3$ and high-crystalline $Li_{1.5}Al_{0.5}Ge_{1.5}(PO_4)_3$ were mixed at a weight ratio of 10:90 in the above "2-3-1".

Comparative Example 3

A ceramic laminate of Comparative Example 3 was obtained by the same method as in Example 7 except that a pellet having a diameter of φ13 mm was produced using only 300 mg of low-crystalline $Li_{1.5}Al_{0.5}Ge_{1.5}(PO_4)_3$, and thus produced pellet was defined as the first layer in the above "2-3-1".

Comparative Example 4

The following step was performed instead of the step described in the above "2-3-2". The specific step will be described in order. First, $LiCoO_2$ and amorphous $Li_{1.5}Al_{0.5}Ge_{1.5}(PO_4)_3$ were weighed out so that the weight ratio of $LiCoO_2$ to amorphous $Li_{1.5}Al_{0.5}Ge_{1.5}(PO_4)_3$ was 100:5, and mixed in a mortar to prepare mixed powder. Then, 20 mg of the mixed powder produced by the above method was uniformly dispersed on the first layer produced by the method described in the above "2-3-1", and thus obtained laminate was pressed by applying pressure of 6 MPa in its layer stacking direction to produce a laminate comprising the first layer and the second layer. Thus produced laminate was sintered for 2 hours at a temperature of 600° C., thereby obtaining a ceramic laminate of Comparative Example 4.

Comparative Example 5

The production of a ceramic laminate of Comparative Example 5 was attempted by the same method as in Example 7 except that low-crystalline $Li_{1.5}Al_{0.5}Ge_{1.5}(PO_4)_3$ and high-crystalline $Li_{1.5}Al_{0.5}Ge_{1.5}(PO_4)_3$ were mixed at a weight ratio of 5:95; however, a pellet was not formed. This is considered because high-crystalline $Li_{1.5}Al_{0.5}Ge_{1.5}(PO_4)_3$ powder was obtained by performing a heat treatment at 900° C., therefore, the volume of the powder was no longer contracted even by burning at 600° C., and thus sintering did not proceed.

Comparative Example 6

The production of a ceramic laminate of Comparative Example 6 was attempted by the same method as in Example 7 except that a pellet having a diameter of φ13 mm was produced using 300 mg of high-crystalline $Li_{1.5}Al_{0.5}Ge_{1.5}(PO_4)_3$ only, and thus produced pellet was defined as the first layer in the above "2-3-1"; however, a pellet was not formed. This is considered because sintering did not proceed as in the case of Comparative Example 5.

3. Evaluation of Residual Ratio of Ceramics

The residual ratio of ceramics of each of the ceramic laminates of Examples 1 to 6 and Comparative Examples 1 and 2 was evaluated.

First, the weight of each of the ceramic laminates after sintering was measured. Next, the surface of each of the ceramic laminates, where the second layer was present, was scraped with a medical paper to peel solid ceramics in the second layer. Then, the weight of each of the ceramic laminates was measured again.

The residual ratio of ceramics was calculated based on the following formula:

Residual ratio of ceramics=([weight of laminate before being scraped with medical paper]−[weight of laminate after being scraped with medical paper])/[weight of laminate before being scraped with medical paper]

As shown in the above formula, the smaller amount of the solid ceramics peeled from the laminate, the higher the residual ratio of ceramics.

Figure 6:
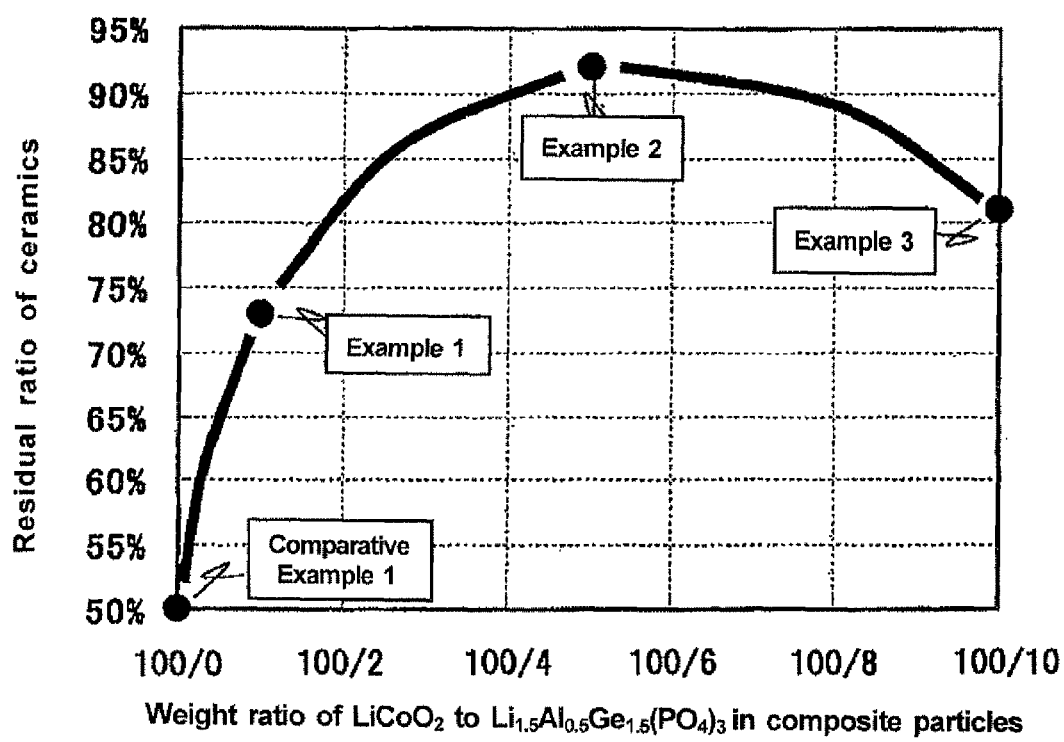
FIG. 6 is a graph which lists results of Examples 1 to 3 and Comparative Example 1.
Figure 7:
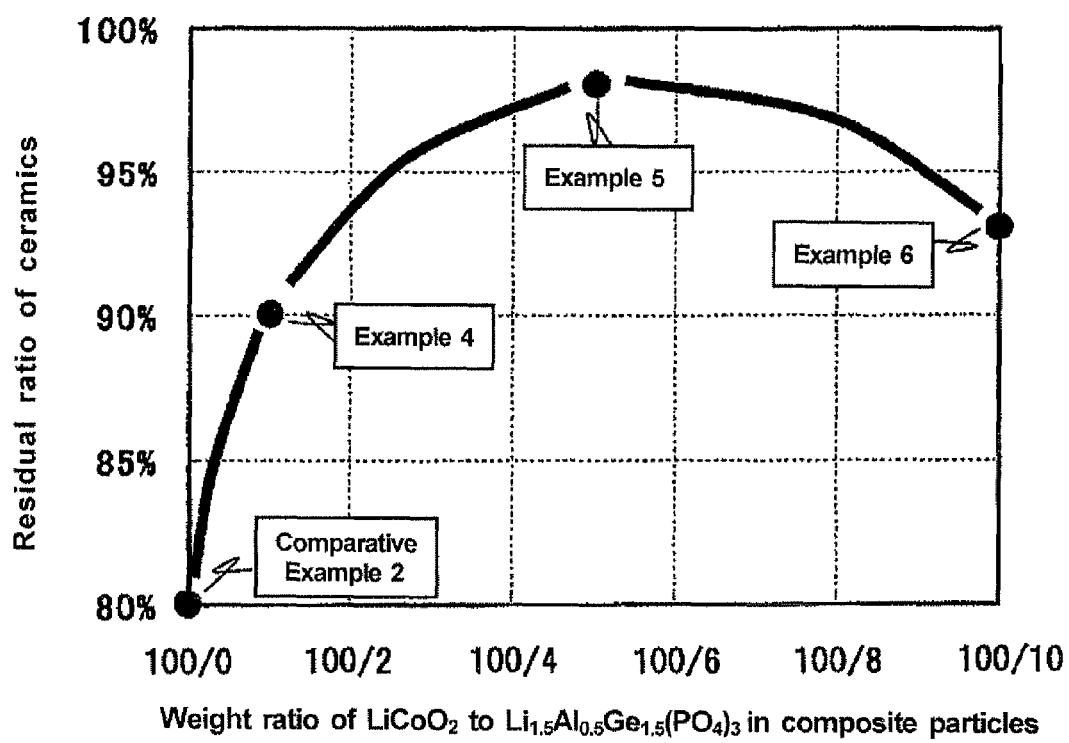
FIG. 7 is a graph which lists results of Examples 4 to 6 and Comparative Example 2.

The following table 1 is a table which lists the residual ratios of ceramics of the ceramic laminates of Examples 1 to 6, and Comparative examples 1 and 2. FIG. 6 is a graph which lists the results of Examples 1 to 3 and Comparative Example 1, and it is also a graph with the residual ratio (%) of ceramics on the vertical axis and the weight ratio of $LiCoO_2$ to $Li_{1.5}Al_{0.5}Ge_{1.5}(PO_4)_3$ in the composite particles on the horizontal axis. FIG. 7 is a graph which lists the results of Examples 4 to 6 and Comparative Example 2, and it is also a graph with residual ratio (%) of ceramics on the vertical axis and the weight ratio of $LiCoO_2$ to $Li_{1.5}Al_{0.5}Ge_{1.5}(PO_4)_3$ in the composite particles on the horizontal axis as in the case of FIG. 6.

TABLE 1

| | Weight ratio of $LiCoO_2$ to $Li_{1.5}Al_{0.5}Ge_{1.5}(PO_4)_3$ in the second layer | Weight ratio of $LiCoO_2$ to $Li_{1.5}Al_{0.5}Ge_{1.5}(PO_4)_3$ in composite particles | Residual ratio of ceramics |
|---|---|---|---|
| Example 1 | 100/20 | 100/1 | 73% |
| Example 2 | 100/20 | 100/5 | 92% |
| Example 3 | 100/20 | 100/10 | 81% |
| Example 4 | 100/30 | 100/1 | 90% |
| Example 5 | 100/30 | 100/5 | 98% |
| Example 6 | 100/30 | 100/10 | 93% |
| Comparative Example 1 | 100/20 | 100/0 | 50% |
| Comparative Example 2 | 100/30 | 100/0 | 80% |

First, the results of Examples 1 to 3 and Comparative Example 1 will be studied. As is clear from Table 1 and FIG. 6, in the ceramic laminate of Comparative Example 1 using no composite particles, the residual ratio of ceramics was 50%, which was the lowest result among the ceramic laminates of Examples 1 to 6 and Comparative Examples 1 and 2. To the contrary, in the ceramic laminates of Examples 1 to 3 using the composite particles, the residual ratio of ceramics was more than 70%. Especially in Example 2 in which the weight ratio of $LiCoO_2$ to $Li_{1.5}Al_{0.5}Ge_{1.5}(PO_4)_3$ in the composite particles was 100:5, the residual ratio of ceramics was 92%, which was the highest result among the ceramic laminates of Examples 1 to 3 and Comparative Example 1.

Next, the results of Examples 4 to 6 and Comparative Example 2 will be studied. As is clear from Table 1 and FIG. 7, in the ceramic laminate of Comparative Example 2 using no composite particles, the residual ratio of ceramics was 80%, which was the lowest result among the ceramic laminates of Examples 4 to 6 and Comparative Example 2. To the contrary, in the ceramic laminates of Examples 4 to 6 using the composite particles, the residual ratio of ceramics was 90% or more. Especially in Example 2 in which the weight ratio of $LiCoO_2$ to $Li_{1.5}Al_{0.5}Ge_{1.5}(PO_4)_3$ in the composite particles was 100:5, the residual ratio of ceramics was 98%, which was the highest result among the ceramic laminates of Examples 1 to 6 and Comparative Examples 1 and 2.

Next, the results of Examples 1 to 3 and Comparative Example 1 will be compared to the results of Examples 4 to 6 and Comparative Example 2. As is clear from FIGS. 6 and 7, it can be understood from the comparison between Examples having the same weight ratio of $LiCoO_2$ to $Li_{1.5}Al_{0.5}Ge_{1.5}(PO_4)_3$ in the composite particles that the residual ratios of ceramics of Examples 4 to 6 and Comparative Example 2 were higher than those of Examples 1 to 3 and Comparative Example 1. Therefore, it can be understood that the residual ratio of ceramics in the case that the weight ratio of $LiCoO_2$ to $Li_{1.5}Al_{0.5}Ge_{1.5}(PO_4)_3$ in the mixture, which will be a material for the second layer, was 100:30 was higher than that in the case that the weight ratio thereof was 100:20.

4. Evaluation of Warpage of Ceramic Laminate

The warpage of each of the ceramic laminates of Examples 7 to 13 and Comparative Examples 3 and 4 was evaluated.

Figure 9:
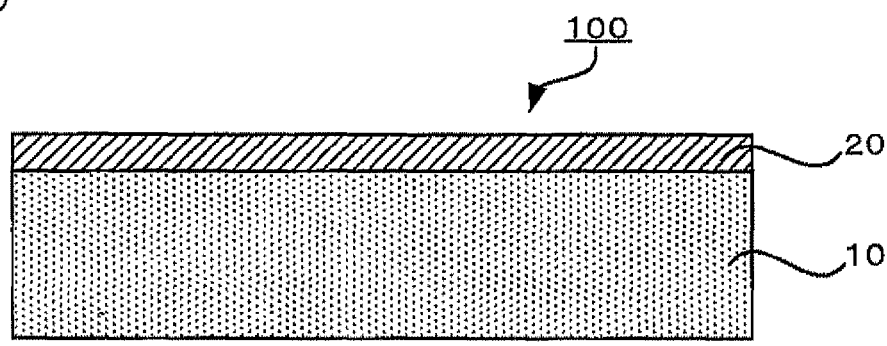
FIG. 9 is a schematic sectional view of a ceramic laminate describing a warpage evaluation method of the ceramic laminate.
Figure 9:
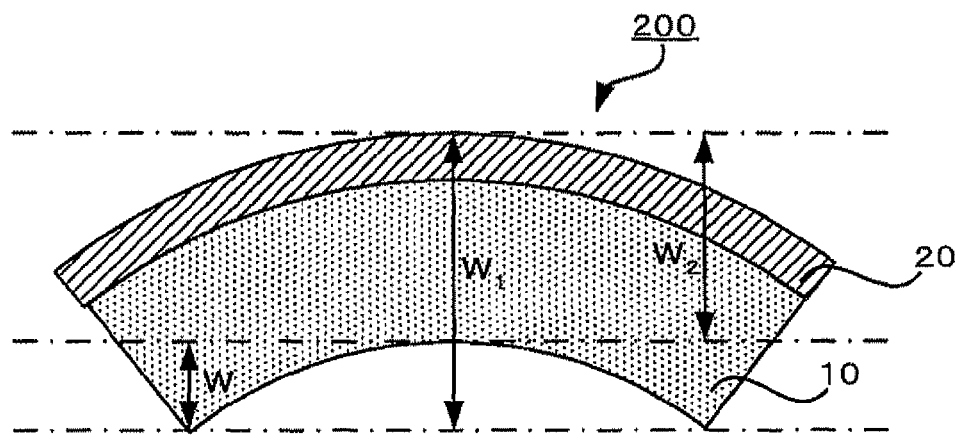

FIG. 9 is a schematic sectional view of the laminate describing the evaluation method of the warpage of the ceramic laminate. FIG. 9 (a) and FIG. 9 (b) show the ceramic laminates before and after sintering, respectively. In FIG. 9 (b), the warpage of the laminate was overdrawn for description.

As shown in FIG. 9 (a), before sintering, warpage was not caused on laminate 100 comprising first layer 10 and second layer 20.

To the contrary, as shown in FIG. 9 (b), after sintering, warpage was caused on laminate 200 by the difference of heat contraction percentage between first layer 10 and second layer 20. In Examples of the present invention, the evaluation was performed by measuring the total thickness $W_1$ (mm) of ceramic laminate and the thickness $W_2$ (mm) of the central part of ceramic laminate to calculate W (mm), which is the difference between $W_1$ and $W_2$.

Figure 8:
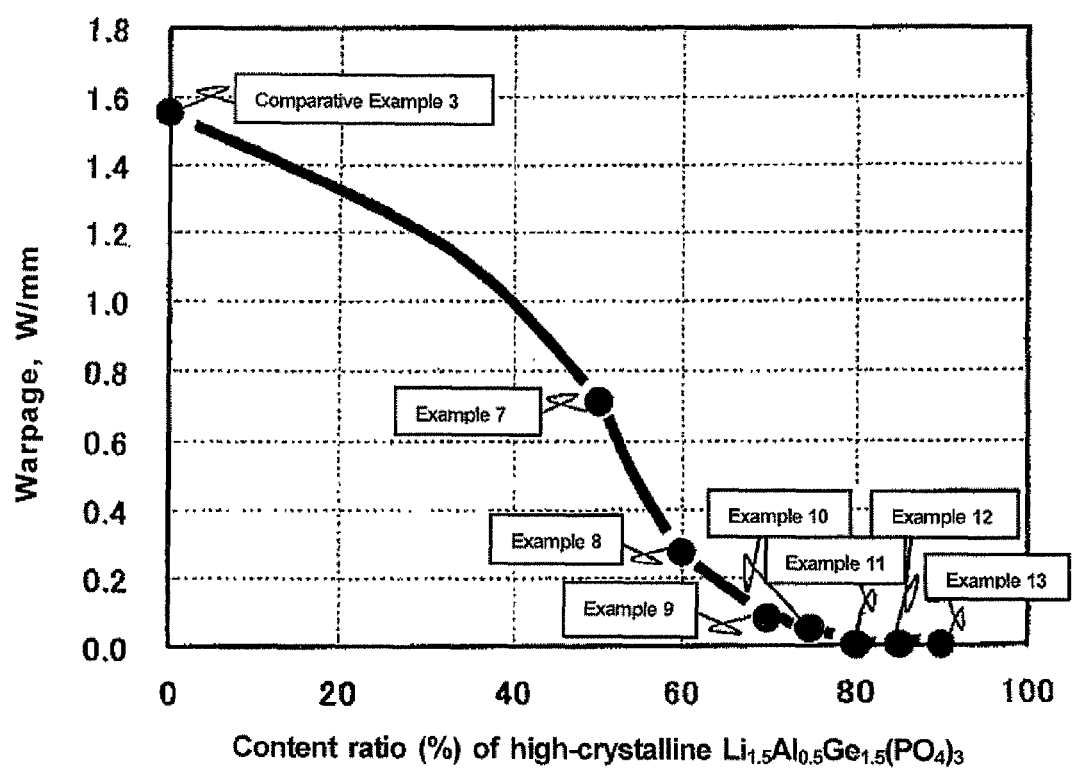
FIG. 8 is a graph which lists results of Examples 7 to 13 and Comparative Example 3.

The following table 2 is a table which lists warpage W of each of the ceramic laminates of Examples 7 to 13 and Comparative Examples 3 to 6. FIG. 8 is a graph which lists the results of Examples 7 to 13 and Comparative Example 3, and it is also a graph with warpage W (mm) on the vertical axis and the content ratio (%) of high-crystalline $Li_{1.5}Al_{0.5}Ge_{1.5}(PO_4)_3$ on the horizontal axis.

TABLE 2

| | Weight ratio of $Li_{1.5}Al_{0.5}Ge_{1.5}(PO_4)_3$ (% by weight) | | Warpage |
|---|---|---|---|
| | Low crystalline $Li_{1.5}Al_{0.5}Ge_{1.5}(PO_4)_3$ | High crystalline $Li_{1.5}Al_{0.5}Ge_{1.5}(PO_4)_3$ | W (mm) |
| Example 7 | 50 | 50 | 0.71 |
| Example 8 | 40 | 60 | 0.27 |
| Example 9 | 30 | 70 | 0.08 |
| Example 10 | 25 | 75 | 0.05 |
| Example 11 | 20 | 80 | 0.00 |
| Example 12 | 15 | 85 | 0.00 |
| Example 13 | 10 | 90 | 0.00 |
| Comparative Example 3 | 100 | 0 | 1.55 |
| Comparative Example 4[1] | 50 | 50 | 1.02 |
| Comparative Example 5 | 5 | 95 | |
| Comparative Example 6 | 0 | 100 | |

[1] Mixed powder of $LiCoO_2$ and amorphous $Li_{1.5}Al_{0.5}Ge_{1.5}(PO_4)_3$ was used for the second solid electrolyte layer.

First, the result of Comparative Example 3 will be studied. As is clear from Table 2 and FIG. 8, in the ceramic laminate of Comparative Example 3 using no high-crystalline $Li_{1.5}Al_{0.5}Ge_{1.5}(PO_4)_3$ for the first layer, the warpage after sintering was 1.55 mm, which was the highest result among the ceramic laminates of Examples 7 to 13 and Comparative Examples 3 and 4.

Next, the results of Examples 7 to 13 will be studied. As is clear from Table 2 and FIG. 8, in the ceramic laminates of Examples 7 to 13 using high-crystalline $Li_{1.5}Al_{0.5}Ge_{1.5}(PO_4)_3$ for the first layer, the warpage after sintering was less than 0.8 mm, which was less than half the warpage of the ceramic laminate of Comparative Example 3. Especially in Examples 9 and 10 in which the weight ratio of low-crystalline $Li_{1.5}Al_{0.5}Ge_{1.5}(PO_4)_3$ to high-crystalline $Li_{1.5}Al_{0.5}Ge_{1.5}(PO_4)_3$ was 30:70 to 25:75, the warpage after sintering was less than 0.1 mm. Further in Examples 11 to 13 in which the weight ratio of low-crystalline $Li_{1.5}Al_{0.5}Ge_{1.5}(PO_4)_3$ to high-crystalline $Li_{1.5}Al_{0.5}Ge_{1.5}(PO_4)_3$ was 20:80 to 10:90, no warpage after sintering was observed despite the fact that the pressure was not applied upon sintering.

As described above, in Comparative Examples 5 and 6 in which the weight ratio of low-crystalline $Li_{1.5}Al_{0.5}Ge_{1.5}(PO_4)_3$ to high-crystalline $Li_{1.5}Al_{0.5}Ge_{1.5}(PO_4)_3$ was 5:95 to 0:100, the pellet was not formed.

Next, the result of Example 7 will be compared to the result of Comparative Example 4. As is clear from Table 2, in the ceramic laminate of Comparative Example 4 using the mixed powder of $LiCoO_2$ and amorphous $Li_{1.5}Al_{0.5}Ge_{1.5}(PO_4)_3$ for the second layer, the warpage after sintering was 1.02 mm. To the contrary, in the ceramic laminate of Example 7 using the composite particles obtained by covering $LiCoO_2$ with low-crystalline $Li_{1.5}Al_{0.5}Ge_{1.5}(PO_4)_2$ for the second layer, the warpage after sintering was 0.71 mm.

From the above results, it can be understood that the effect of preventing the warpage of the laminate after sintering in the present invention is provided not by using the mixed powder obtained by simply mixing the solid electrolyte and the electrode active material for the second layer, but by using the composite particles obtained by covering the electrode active material with the solid electrolyte for the second layer.

Reference Signs List

1: Layer made of continuous solid electrolyte
1a: Low-crystalline solid electrolyte
1b: Solid electrolyte 1b having higher degree of crystallinity than that of solid electrolyte 1a
2: Electrode active material
3: Composite particle
10: First layer
20: Second layer
30: Interface
100: Laminate before heat treatment step
200: laminate after heat treatment step
$W_1$: Total thickness of ceramic laminate
$W_2$: Thickness of central part of ceramic laminate
W: Difference between $W_1$ and $W_2$

The invention claimed is:

1. A method for producing a ceramic laminate having a layer structure in which two or more layers are laminated, comprising:
 a step of producing a laminate comprising a first layer and a second layer, the first layer containing a low-crystalline solid electrolyte and the second layer containing at least composite particles obtained by covering an electrode active material with the solid electrolyte; and
 a step of performing a heat treatment on the laminate comprising the first and second layers at a temperature of 500° C. or more and less than 700° C.; wherein
 the low-crystalline solid electrolyte has a chemical composition represented by the following Formula (1):

Formula (1): 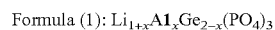

where $0<x<1$,
the second layer further contains the low-crystalline solid electrolyte in addition to the composite particles,
the total content of the low-crystalline solid electrolyte in the second layer is 10 to 40 parts by weight with respect to 100 parts by weight of the electrode active material in the second layer, and
the low-crystalline solid electrolyte is a material in which the S/N (signal/noise) ratio of an XRD pattern of the crystal increases after the heat treatment.

2. The method for producing the ceramic laminate according to claim 1, wherein the step of producing the laminate comprises:
a step of preparing the first layer containing the solid electrolyte;
a step of preparing the composite particles by covering the electrode active material with the solid electrolyte; and
a step of forming the second layer by dispersing at least the composite particles on at least one surface of the first layer.

3. The method for producing the ceramic laminate according to claim 1, wherein the step of producing the laminate comprises:
a step of preparing the composite particles by covering the electrode active material with the solid electrolyte;
a step of forming the second layer containing the composite particles; and
a step of forming the first layer by dispersing the low-crystalline solid electrolyte on at least one surface of the second layer.

4. The method for producing the ceramic laminate according to claim 1, wherein the electrode active material is a material selected from the group consisting of $LiCoO_2$, $LiMn_2O_4$, $LiNi_{0.5}Mn_{1.5}O_4$, $Li_4Ti_5O_{12}$, $LiFePO_4$ and $Nb_2O_5$.

5. The method for producing the ceramic laminate according to claim 1, wherein the content of the low-crystalline solid electrolyte in the composite particles is 1 to 10 parts by weight with respect to 100 parts by weight of the electrode active material in the composite particles.

* * * * *